US012109574B2

(12) United States Patent
Guerrero Palma et al.

(10) Patent No.: US 12,109,574 B2
(45) Date of Patent: Oct. 8, 2024

(54) ROLLER MILL WITH A SYNCHRONIZING DEVICE

(71) Applicants: thyssenkrupp Industrial Solutions AG, Essen (DE); thyssenkrupp AG, Essen (DE)

(72) Inventors: Pedro Guerrero Palma, Lippetal (DE); Alexander Peters, Beckum (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 242 days.

(21) Appl. No.: 17/799,186

(22) PCT Filed: Feb. 9, 2021

(86) PCT No.: PCT/EP2021/053044
§ 371 (c)(1),
(2) Date: Aug. 11, 2022

(87) PCT Pub. No.: WO2021/160592
PCT Pub. Date: Aug. 19, 2021

(65) Prior Publication Data

US 2023/0085467 A1 Mar. 16, 2023

(30) Foreign Application Priority Data

Feb. 14, 2020 (BE) .................................. 2020/5092
Feb. 14, 2020 (DE) ..................... 10 2020 201 892.8

(51) Int. Cl.
*B02C 4/32* (2006.01)
*B02C 4/02* (2006.01)

(52) U.S. Cl.
CPC . *B02C 4/32* (2013.01); *B02C 4/02* (2013.01)

(58) Field of Classification Search
CPC ................ B02C 4/32; B02C 4/02; B02C 4/34
See application file for complete search history.

(56) References Cited

U.S. PATENT DOCUMENTS

2011/0006144 A1 1/2011 Guerrero Palma
2011/0253825 A1 10/2011 Frerich et al.
(Continued)

FOREIGN PATENT DOCUMENTS

CL 201602320 A 6/2017
CN 101946097 A 1/2011
(Continued)

OTHER PUBLICATIONS

English Translation of International Search Report issued in PCT/EP2021/053044, dated Mar. 29, 2021.

*Primary Examiner* — Bobby Yeonjin Kim
(74) *Attorney, Agent, or Firm* — thyssenkrupp North America, LLC

(57) ABSTRACT

A roller mill for comminuting bulk material may include a first grinding roller and a second grinding roller that are arranged opposite one another and can be driven in opposite directions. A grinding gap exists between the grinding rollers. A floating bearing unit may be configured to receive the first grinding roller, and a fixed bearing unit may be configured to receive the second grinding roller. The floating bearing unit includes two bearings, each of which receives one end of the first grinding roller. Hydraulic actuators are mounted on the floating bearing unit for applying a force to the floating bearing unit. The bearings of the floating bearing unit are connected to one another via a synchronization device that includes a coupling element, which in a coupling position prevents a relative movement of the bearings and in a free position permits a relative movement of the bearings.

11 Claims, 3 Drawing Sheets

(56) References Cited

U.S. PATENT DOCUMENTS

| | | | |
|---|---|---|---|
| 2012/0111982 | A1 | 5/2012 | Ruether et al. |
| 2013/0087054 | A1 | 4/2013 | Frangenberg |
| 2015/0014455 | A1 | 1/2015 | Berger |
| 2016/0101424 | A1 | 4/2016 | Frerich et al. |

FOREIGN PATENT DOCUMENTS

| | | | | | |
|---|---|---|---|---|---|
| CN | 102218356 | A | | 10/2011 | |
| CN | 102451785 | A | | 5/2012 | |
| CN | 102784680 | A | | 11/2012 | |
| CN | 102947003 | A | | 2/2013 | |
| CN | 104220172 | A | | 12/2014 | |
| CN | 105142791 | A | | 12/2015 | |
| CN | 105797809 | A | * | 7/2016 | ............... B02C 4/32 |
| CN | 109482265 | A | * | 3/2019 | ............. B02C 25/00 |
| CN | 110142089 | A | * | 8/2019 | ............... B02C 4/02 |
| DE | 37 05 050 | A1 | | 9/1988 | |
| DE | 39 22 638 | A1 | | 1/1991 | |
| DE | 39 30 773 | A1 | | 3/1991 | |
| DE | 10 2010 024 231 | A1 | | 12/2011 | |
| WO | 2019/093954 | A1 | | 5/2019 | |
| WO | 2019/093956 | A1 | | 5/2019 | |

* cited by examiner

ROLLER MILL WITH A SYNCHRONIZING DEVICE

CROSS REFERENCE TO RELATED APPLICATIONS

This application is a U.S. National Stage Entry of International Patent Application Serial Number PCT/EP2021/053044, filed Feb. 9, 2021, which claims priority to German Patent Application No. DE 10 2020 201 892.8, filed Feb. 14, 2020, and Belgian Patent Application No. BE 2020/5092, filed Feb. 14, 2020, the entire contents of all of which are incorporated herein by reference.

FIELD

The present disclosure generally relates to comminuting, including roller mills for comminuting bulk material and roller mills with two grinding rollers that are connected to a synchronization device.

BACKGROUND

Roller mills are usually used to crush grinding stock, such as limestone, clinker, ore or similar rocks, for example. A roller mill usually has two grinding rollers which are arranged parallel to one another and can be rotated in opposite directions, a grinding gap for comminuting the material being formed between the grinding rollers. DE 39 30 773 A1 discloses a roller mill with a fixedly mounted grinding roller and a grinding roller mounted in a floating manner, each of the rollers mounted in a floating manner being connected to hydraulic actuators.

During operation of the roller mill, the grinding rollers are often subject to uneven loading, which can be attributed, for example, to uneven wear on the surface of the grinding rollers or materials with different properties and grain sizes. Such uneven loading leads to skewed running of the grinding rollers, whereupon the grinding rollers are not arranged parallel to one another. An increased degree of skewed running results in uneven wear of or in damage to the grinding roller, with in particular edge elements mounted on the roller ends being damaged or destroyed. WO2019093954, for example, discloses a roller mill that does not allow any relative movement of the grinding rollers. However, completely preventing the skewed running of the grinding rollers leads to high loading on the bearings of the grinding rollers, with the result that they fail much earlier.

Thus a need exists for a roller mill that reliably prevents damage to the roller mill, in particular to the grinding rollers and the bearings, caused by skewed running of the grinding rollers.

DETAILED DESCRIPTION

Figure 1:
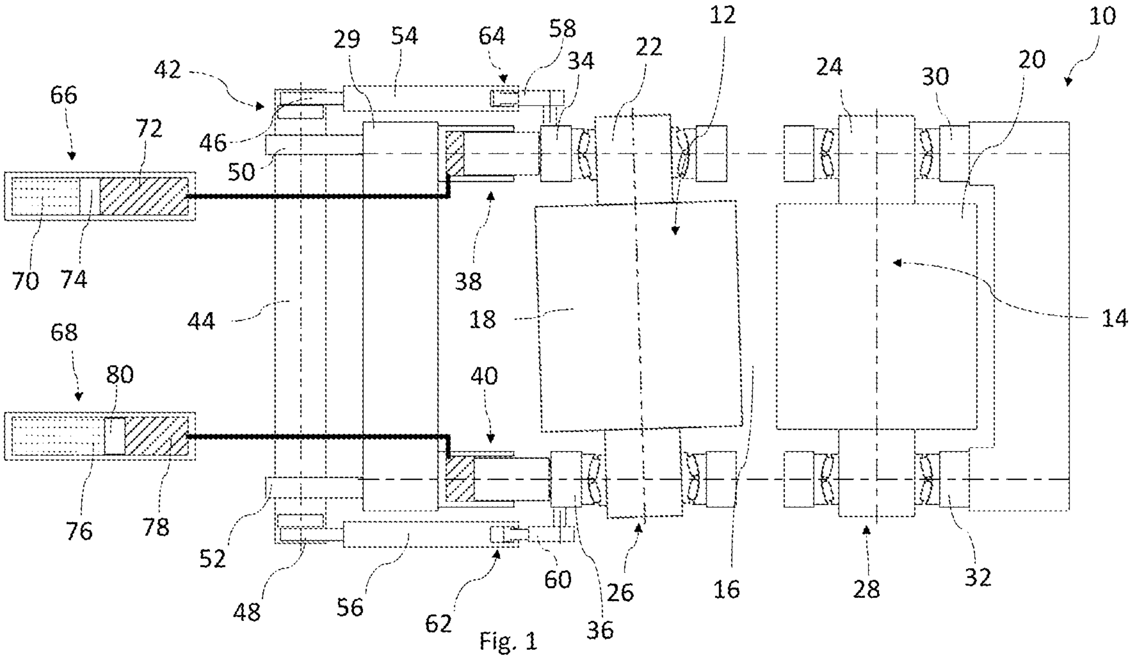
FIG. 1 is a schematic, longitudinal sectional view of a roller mill with a synchronization device according to one exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a roller mill for comminuting bulk material comprises a first grinding roller and a second grinding roller, which are arranged opposite one another and can be driven in opposite directions, wherein a grinding gap is formed between the grinding rollers. The roller mill also has a floating bearing unit for receiving the first grinding roller and a fixed bearing unit for receiving the second grinding roller, wherein the floating bearing unit has two bearings, each of which receives one end of the first grinding roller. A plurality of hydraulic actuators are mounted on the floating bearing unit for the purpose of applying a force to the floating bearing unit, and wherein the bearings of the floating bearing unit are connected to one another via a synchronization device. The synchronization device has a coupling element which, in a coupling position, prevents a relative movement of the bearings of the floating bearing unit and, in a free position, permits a relative movement of the bearings of the floating bearing unit.

In particular, the floating bearing unit has two bearings, each of which receives one end of the first grinding roller. Each grinding roller preferably has a roller basic body and a roller shaft which is coaxial with and protrudes from the roller basic body, in particular at the end faces thereof. In particular, the roller shaft is received at its opposite ends in a respective bearing of the floating bearing unit. The bearings of the floating bearing unit are preferably received so as to be able to move, in particular in the radial direction, on a machine frame of the roller mill, with the bearings of the fixed bearing unit being fixedly mounted on the machine frame. Preferably, each bearing has a bearing jewel and a rolling bearing unit, mounted thereon, with an outer and an inner bearing ring and rolling bodies arranged in between. The outer bearing ring is preferably fixedly mounted on the bearing jewel. The floating bearing unit and the fixed bearing unit each have two bearing jewels, wherein the bearing jewels of the floating bearing unit are received so as to be able to move on the machine frame and the bearing jewels of the fixed bearing unit are fastened to the machine frame, with the result that the bearing jewel is not movable relative to the machine frame.

The hydraulic actuator is an actuating element that applies a force to the floating bearing unit and moves it, for example. A hydraulic actuator is preferably mounted on each bearing jewel of the floating bearing unit. The hydraulic actuator has, for example, a cylinder with a piston mounted movably therein, with a movement of the piston resulting in a movement of the bearing jewel or in a change in the force acting on the bearing jewel.

The synchronization device preferably has a rotatable shaft which is fastened to the machine frame. In particular, the shaft is mounted so as to be able to rotate about its longitudinal axis. A respective thrust rod is mounted on the ends of the shaft, for example via a lever, with the lever extending at an angle of approximately 60-120°, preferably 90°, in relation to the respective thrust rod. Each thrust rod is connected to a bearing, in particular the bearing jewel, of the floating bearing unit. The thrust rod is preferably mounted on the respective bearing via the coupling element in such a way that the thrust rod and the bearing are movable relative to one another to a limited extent. In particular, the bearing can be moved in the horizontal direction, preferably in the direction of extent of the thrust rod, in the machine frame by a certain amount, in particular a distance difference. The connection of the thrust rod to the respective bearing preferably has a clearance, with the result that the thrust rod and the bearing can be moved relative to one another by a certain amount, in particular a distance. The thrust rod and the bearing are preferably movable relative to one another exclusively linearly in the direction of extent of the thrust rod. The movement of the thrust rod and of the bearing are preferably coupled, with the result that the coupling element is in the coupling position when a certain distance difference between the bearing and the thrust rod is exceeded.

In the coupling position of the coupling element, a relative movement of the bearings in at least one direction, preferably in the radial direction of the grinding roller, in particular in the direction in which the extent of the skewed running is increased, is prevented. The coupling element preferably has two coupling positions, wherein the coupling element is movable from the first coupling position into the second coupling position via the free position. The coupling element is preferably designed in such a way that it couples the bearing to the respective thrust rod when the relative movement of the bearings of the floating bearing unit, preferably of a bearing and the thrust rod, exceeds a predetermined distance limit value. The distance limit value is preferably a clearance of approximately ±1 mm to ±20 mm, preferably ±5 mm, wherein the distance limit value is in particular a deviation of the position of the bearing relative to an inactive position that corresponds to the desired size of the grinding gap. If the relative movement exceeds the distance limit value, the coupling element is in the coupling position and couples the movement of the bearings of the floating bearing unit, preferably the thrust rod, to the respective bearing, with the result that they are fixedly connected to one another and no relative movement in the respective direction of movement is possible. Coupling is to be understood to mean the synchronization of the bearings, for example. In the free position, a maximum relative movement of the bearings corresponding to the distance limit value is possible.

When the roller mill is in operation, uneven loading on the grinding roller causes the grinding rollers to run skewed, at least one bearing of the floating bearing unit being moved in the radial direction. If this radial movement exceeds the magnitude of the clearance between the coupling positions of the coupling element, the respective bearing and the thrust rod connected thereto, the thrust rod is moved in the radial direction and rotates the shaft of the synchronization device via the lever. Rotation of the shaft results in a movement of the second thrust rod and a corresponding movement of the bearing connected thereto of the floating bearing unit. A clearance between the thrust rods and the floating bearing unit allows an amount of a relative movement of the thrust rod and the bearing that is determined in advance, with the result that a certain skewed running of the grinding rollers is allowed but limited, and therefore damage to the grinding rollers caused by excessive skewed running is prevented. The clearance is preferably in the horizontal direction, in particular in the direction of the grinding force or the direction of extent of the thrust rod. The clearance is ±1 mm to ±20 mm, preferably ±5 mm, for example.

According to a first embodiment, the synchronization device has a rotatable shaft and at least two thrust rods, wherein a respective end of the thrust rods is connected to the shaft and the respective other end is connected to the floating bearing unit, wherein the thrust rods and/or the shaft have the coupling element. The hydraulic actuator is preferably mounted directly on the respective bearing.

According to a further embodiment, the synchronization device comprises a rotatable shaft and at least two thrust rods, wherein a respective end of the thrust rods is connected to the shaft and the respective other end is connected to a respective bearing of the floating bearing unit, wherein the thrust rods are respectively connected to the respective bearing of the floating bearing unit and/or of the shaft via a coupling element. In particular, each bearing of the floating bearing unit is connected to at least one hydraulic actuator and a thrust rod, wherein the connection of the bearing to the respective thrust rod has a coupling unit.

According to a further embodiment, the coupling element comprises a linear guide. The linear guide is preferably designed in such a way that it allows a relative movement of the thrust rod and the bearing in the direction of the grinding force or the extent of the thrust rod and prevents it in other directions. According to a further embodiment, the linear guide has at least one stop for delimiting the relative movement of the bearing with respect to the thrust rod.

According to a further embodiment, the coupling element is formed at least partially in the thrust rod, wherein each thrust rod has at least one coupling element. For example, the coupling element is formed in an end region of the thrust rod, preferably in the end region that faces the bearing. According to a further exemplary embodiment, the coupling element comprises a hydraulic actuator, preferably having a hydraulic cylinder in which a piston is arranged, which separates two hydraulic chambers from one another. For example, an end region of the thrust rod is in the form of a hydraulic cylinder.

According to a further embodiment, the roller mill has two coupling elements which are hydraulically connected to one another. Each coupling unit is preferably mounted on a thrust rod. In particular, the hydraulic chambers of the respective coupling elements are connected to one another. A hydraulic connection of the coupling elements ensures a uniform movement of the two coupling elements. The hydraulic connection of the coupling elements optionally comprises a throttling element, such as a throttle flap, for example, for throttling, preferably delimiting, the relative speeds of the thrust rods, in particular the grinding rollers.

According to a further embodiment, the coupling element comprises a hollow cylinder which is formed in an end region of the thrust rod. The thrust rods are in particular each mounted on the respective bearing of the floating bearing unit by means of a fastening element, wherein the fastening element is fastened to the floating bearing unit and is connected to the respective thrust rod so as to be able to move relative to one another. The fastening element comprises, for example, a piston which is arranged so as to be able to slide within the hollow cylinder formed in the thrust rod. The hollow cylinder preferably forms a stop for delimiting the relative movement of the bearing with respect to the thrust rod. The clearance is determined in particular by the piston stroke, preferably the length of the hollow cylinder.

According to a further embodiment, the shaft has a first shaft portion and a second shaft portion, which are connected to one another via the coupling element. According to a further embodiment, the coupling element is in the form of a claw coupling. A coupling element in the form of a claw coupling preferably comprises a coupling shaft and a hollow shaft arranged concentrically thereto around it, wherein the coupling shaft is fixedly connected to one shaft portion and the hollow shaft is fixedly connected to the other shaft portion. The hollow shaft and the coupling shaft preferably have connecting elements which interact in a coupling position, with the result that a relative movement of the coupling shaft and the hollow shaft is prevented and, in a free position, a relative movement of the coupling shaft and the hollow shaft is permitted. The connecting elements comprise, for example, projections which are arranged circumferentially on the coupling shaft and interact with cutouts arranged on the inner circumference in the hollow shaft. The cutouts are preferably larger than the projections, with the result that a certain relative rotation of the coupling shaft and the hollow shaft is possible.

It is likewise conceivable that the hydraulic actuators fastened to the bearings are each connected to a damper unit. The damper units are each connected to the hydraulic actuators via a hydraulic line. In particular, each damper unit is in the form of a single-action hydraulic cylinder and in each case has a cylinder with a piston, which separates a gas chamber from a hydraulic chamber and is movable within the cylinder. The gas chamber is preferably filled with a compressible gas, such as nitrogen, for example, wherein the hydraulic chamber is filled with a non-compressible hydraulic oil and connected to the respective hydraulic line, with the result that hydraulic oil can flow from the respective hydraulic line into the hydraulic chamber. The damper unit serves as a damper for the hydraulic actuators and preferably generates the force.

FIG. 1 shows a roller mill 10 with a first grinding roller 12 and a second grinding roller 14, the grinding rollers 12, 14 being arranged opposite one another and being rotatable in opposite directions. A grinding gap 16 is formed between the grinding rollers 12, 14. The grinding rollers 12, 14 each have a substantially cylindrical roller basic body 18, 20 and a drive shaft 22, 24 arranged coaxially therewith, the ends of which preferably extend beyond the respective roller basic body 18, 20 in the axial direction. Each of the grinding rollers 12, 14 is received in a bearing unit, the bearing units being supported, for example, on a machine frame 29, which is not illustrated in full in FIG. 1. The first grinding roller 12 is received in a floating bearing unit 26, the second grinding roller 14 being received in a fixed bearing unit 28. The fixed bearing unit 28 comprises two bearings 30, 32, each of which is arranged at opposite roller ends and receives the drive shaft 24. The bearings 30, 32 are fixedly mounted on the machine frame 29, with the result that they take up forces in particular in the axial and radial direction of the grinding roller 14 and are not movable. The floating bearing unit 26 comprises two bearings 34, 36, each of which receives one end of the drive shaft 22 of the first grinding roller 12. The bearings 34, 36 of the floating bearing unit 26 are received on the machine frame 29 in such a way that they are movable linearly, in particular horizontally, preferably in a sliding manner. The bearings 34, 36 are also preferably fixedly mounted in the axial direction of the first grinding roller 12. The bearings 34, 36 of the floating bearing unit 26 are each mounted so as to be able to move in the radial direction of the grinding rollers 12, 14 and are each connected to one, preferably in each case two, hydraulic actuators 38, 40. The hydraulic actuators 38, 40 each serve to apply a grinding force in the direction of the second grinding roller 14 to the first grinding roller 12, which is mounted in the floating bearing unit 26. The grinding force is preferably aligned in a direction orthogonal to the feed of the material into the grinding gap 16, in particular the grinding force is horizontal. The floating bearing unit 26 is movable in particular in the direction of the grinding force applied by means of the hydraulic actuators 38, 40.

The hydraulic actuators 38, 40 are each supported by way of their one end on a bearing 34, 36 and by way of their opposite, other end on the machine frame 29. A movement of the respective bearing 34, 36 of the floating bearing unit 26 results in a corresponding movement of the hydraulic actuator 38, 40 mounted on it in each case. Each hydraulic actuator 38, 40 preferably has a cylinder and a piston mounted movably therein, the movement of the hydraulic actuator being understood to mean a movement of the piston within the cylinder, for example.

The roller mill 10 also has a synchronization device 42. The synchronization device 42 serves to couple, in particular to synchronize, the movement of the bearings 34, 36 of the floating bearing unit 26, with the result that the bearings 34, 36 move synchronously and in particular skewed running of the grinding roller 12, 14, in the event of which they are not aligned parallel to one another, is avoided or preferably limited. The synchronization device 42 has a shaft 44, on each end of which a lever 46, 48 is mounted, each of which extends in the radial direction of the shaft 44. By way of example, the shaft 44 is fastened to the machine frame 29 via two fastening means 50, 52, the shaft 44 being connected rotatably to the fastening means 50, 52, for example by means of respective bearings, with the result that the shaft 44 can rotate relative to the fastening means 50, 52 about its central longitudinal axis. A thrust rod 54, 56 is mounted on each of the levers 46, 48 and each thrust rod is connected to a bearing 34, 36 of the floating bearing unit 26. Preferably, the thrust rods 54, 56 are each mounted on the housing of the respective bearing 34, 36. The thrust rods 54, 56 of the synchronization device 44 are mounted in particular on the bearings 34, 36 of the floating bearing unit 26 in such a way that the bearings 24, 36 and the respective thrust rod 54, 56 are movable relative to one another, preferably in the direction of the grinding force or in the direction of extent of the thrust rods 54, 56. The thrust rods 54, 56 are preferably each connected to the respective bearing 34, 36 via a fastening element 58, 60, the thrust rod 54, 56 being fastened by way of its one end to the respective lever 46, 48 and by way of the other end to the fastening element 58, 60. The fastening elements 58, 60 and the thrust rods 54, 56 are connected to one another in such a way that they are movable relative to one another. By way of example, a coupling element 62, 64 is provided which serves to couple the fastening element 58, 60 to the thrust rod 54, 56. The coupling element 62, 64 is, for example, a linear guide that permits only a linear movement, preferably in the direction of the grinding force, in the radial direction of the grinding rollers 12, 14 or in the direction of extent of the thrust rod 54, 56.

In the exemplary embodiment of FIG. 1, by way of example the coupling element 62, 64 comprises a hollow cylinder which is formed in an end region of the thrust rod 54, 56. A piston is arranged within the hollow cylinder and forms an end region of the fastening element 60. The piston is arranged so as to be able to slide within the hollow cylinder. The hollow cylinder and the piston are designed in such a way that the piston stroke is approximately 1 mm to 20 mm, preferably 10 mm. The coupling element 62, 64 shown in FIG. 1 is in a coupling position, in which the relative movement of the thrust rods 54, 56, in particular of the grinding rollers 12, 14, is prevented in at least one direction, specifically in the direction in which the extent of the skewed running is increased.

The hydraulic actuators 38, 40 fastened to the bearings 34, 36 are optionally connected to a respective damper unit 66, 68 for optional generation of the grinding force. The damper units 66, 68 are each connected to the hydraulic actuators 38, 40 via one of the hydraulic lines. The damper units 66, 68 preferably have a substantially identical form. Each damper unit 66, 68 is in particular in the form of a single-action hydraulic cylinder and has in each case a cylinder with a piston 74, 80, which separates a gas chamber 70, 76 from a hydraulic chamber 72, 78 and is movable within the cylinder. The gas chamber 70, 76 is preferably filled with a compressible gas, such as nitrogen, for example, wherein the hydraulic chamber 72, 78 is filled with a non-compressible hydraulic oil and connected to the respective hydraulic line, with the result that hydraulic oil can flow from the respective hydraulic line into the hydraulic chamber 72, 78. The damper unit 66, 68 serves as a spring for the hydraulic actuators 38, 40.

During operation of the roller mill 10, the hydraulic actuators 38, 40 each initially have the same hydraulic pressure applied to them. In the event of skewed running of the grinding rollers 12, 14, which can be caused by uneven loading of the grinding rollers during the grinding process, for example, one of the bearings 34, 36 of the floating bearing unit moves away from the grinding gap 16, with the result that the hydraulic cylinders 38 or 40 connected to the respective bearing 34 or 36 are moved with the bearing 34, 36. A movement of at least one of the bearings 34, 36 results in a movement of the respective fastening element 50, 52 connected to the bearing 34, 36 relative to the respective thrust rod 54, 56. If the relative movement exceeds the piston stroke in the respective coupling element 62, 64, this results in a movement of the respective thrust rod 54, 56. Each thrust rod 54, 56 is connected to the shaft 44 via a radial lever 46, 48 so that a movement of a thrust rod 54, 56 results in a rotation of the shaft 44, as a result of which the movements of the thrust rods 54, 56 are coupled. As a result, skewed running of the grinding rollers 12, 14 relative to one another is allowed and delimited.

Such delimited skewed running prevents damage to the grinding roller, in particular damage being prevented at the edge elements mounted on the roller ends. As soon as the uneven loading, for example due to variabilities in the material composition, has gone, the hydraulic pressure is automatically adjusted back to the initial value by the damper unit 66, 68 and the hydraulic actuators 38, 40.

Figure 2:
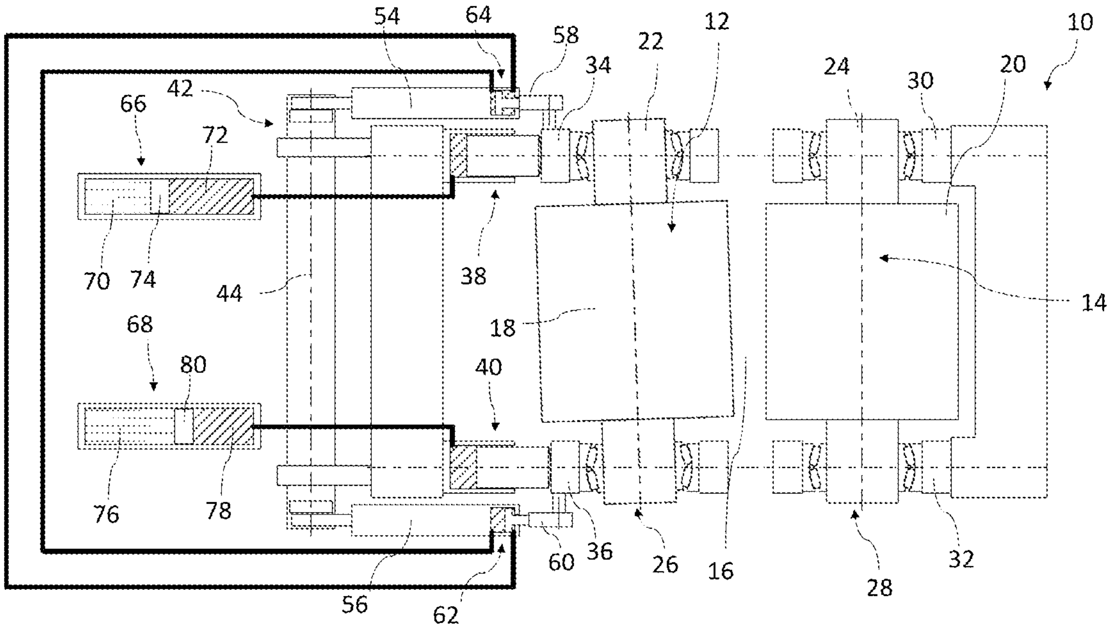
FIG. 2 is a schematic, sectional view of a roller mill with a synchronization device according to a further exemplary embodiment.

FIG. 2 shows a further exemplary embodiment of a roller mill 10 with a synchronization device 42, the same elements being provided with the same reference signs. By contrast to the roller mill of the exemplary embodiment of FIG. 1, the roller mill 10 of FIG. 2 has an alternative coupling element 62, 64. The coupling elements 62, 64 of FIG. 2 each comprise a hydraulic actuator with two hydraulic chambers, which are separated from one another by a piston. The hydraulic chambers of the coupling unit 62, 64 are preferably filled with a non-compressible hydraulic oil. The piston is preferably formed on one end of the fastening element 58, 60. The roller mill 10 preferably has two coupling elements 62, 64, each of which is arranged for the purpose of coupling one of the thrust rods 54, 56 to one of the bearings 34, 36 of the floating bearing unit 26 in each case. By way of example, the coupling elements 62, 64 are connected to one another via hydraulic lines, each hydraulic chamber of a coupling unit 62, 64 being connected to the corresponding hydraulic chamber of the other coupling element 62, 64 via a hydraulic line, with the result that, in the event of skewed running of the grinding rollers 12, 14, a movement of one of the pistons results in the respective other piston moving in the opposite direction, skewed running of the grinding rollers 12, 14 being permitted and delimited to the piston stroke.

It is likewise conceivable that the coupling elements 62, 64 in the form of hydraulic actuators are not connected to one another via a hydraulic line, but are each connected to an additional pretensioning element, not illustrated, such as a hydraulic cylinder, for example. The pretensioning element applies a pretensioning force to the respective hydraulic cylinder.

Figure 3:
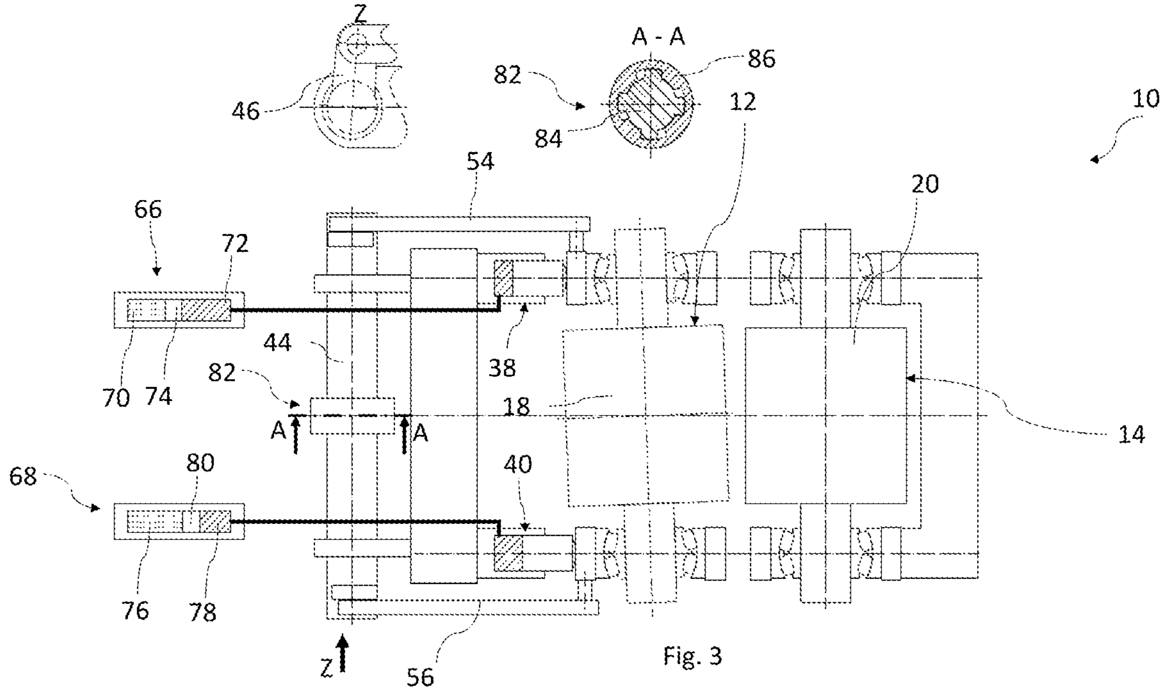
FIG. 3 is a schematic, sectional view of a roller mill with a synchronization device according to a further exemplary embodiment.

FIG. 3 shows a further exemplary embodiment of a roller mill 10 with a synchronization device 42, the same elements being provided with the same reference signs. By contrast to the roller mill of the exemplary embodiment of FIG. 2, the roller mill 10 of FIG. 3 has an alternative coupling element 82, which is arranged in the shaft 44. By way of example, the shaft 44 has two shaft portions which are connected to one another via the coupling element 82. In particular, the coupling element 82 is in the form of a claw coupling, which has an inner coupling shaft 84 and an outer hollow shaft 86 arranged concentrically thereto. By way of example, the coupling shaft 84 has projections on its outer circumference, which interact with cutouts in the inner circumference of the hollow shaft 86. The cutouts are larger than the projections, with the result that a clearance is formed between them and a rotation relative to one another through a certain angle is allowed. For example, the inner coupling shaft 84 is connected to one portion of the shaft 44 and the outer hollow shaft 86 is connected to the respective other portion of the shaft 44, with the result that a certain relative rotation of the shaft portions is permitted in order to allow a certain extent of skewed running of the grinding rollers 12, 14.

LIST OF REFERENCE SIGNS

10 Roller mill
12 First grinding roller
14 Second grinding roller
16 Grinding gap
18 Roller basic body
20 Roller basic body
22 Drive shaft
24 Drive shaft
26 Floating bearing unit
28 Fixed bearing unit
29 Machine frame
30 Bearing
32 Bearing
34 Bearing
36 Bearing
38 Hydraulic actuator
40 Hydraulic actuator
42 Synchronization device
44 Shaft
46 Lever
48 Lever
50 Fastening means
52 Fastening means
54 Thrust rod
56 Thrust rod
58 Fastening element
60 Fastening element
62 Coupling element
64 Coupling element

66 Damper unit
68 Damper unit
70 Gas chamber
72 Hydraulic chamber
74 Piston
76 Gas chamber
78 Hydraulic chamber
80 Piston
82 Coupling element
84 Coupling shaft
86 Hollow shaft

What is claimed is:

1. A roller mill for comminuting bulk material, comprising:

a first grinding roller and a second grinding roller that are arranged opposite one another and are configured to be driven in opposite directions, wherein a grinding gap exists between the first and second grinding rollers;

a floating bearing unit configured to receive the first grinding roller, wherein the floating bearing unit includes two bearings, each of the two bearings being configured to receive an end of the first grinding roller;

a fixed bearing unit configured to receive the second grinding roller;

hydraulic actuators mounted on the floating bearing unit, the hydraulic actuators being configured to apply a force to the floating bearing unit; and a synchronization device, wherein the two bearings of the floating bearing unit are connected to one another via the synchronization device, wherein the synchronization device includes a coupling element that in a coupling position prevents a relative movement of the bearings and in a free position permits a relative movement of the bearings.

2. The roller mill of claim 1 wherein the synchronization device includes a rotatable shaft and at least two thrust rods, wherein a first end of each thrust rod is connected to the rotatable shaft and a second end of each thrust rod is connected to a respective bearing of the floating bearing unit, wherein the at least two thrust rods are connected to the respective bearing of the floating bearing unit and/or the rotatable shaft via the coupling element in each case.

3. The roller mill of claim 1 wherein the coupling element comprises a linear guide.

4. The roller mill of claim 1 wherein the synchronization device includes a rotatable shaft and at least two thrust rods, wherein a first end of each thrust rod is connected to the rotatable shaft and a second end of each thrust rod is connected to the floating bearing unit, wherein the thrust rods and/or the rotatable shaft comprises the coupling element.

5. The roller mill of claim 4 wherein the coupling element comprises a linear guide, wherein the linear guide includes a stop configured to delimit the relative movement of the bearing relative to the thrust rod.

6. The roller mill of claim 4 wherein the coupling element is a first coupling element that is disposed at least partially in a first of the thrust rods, wherein a second of the thrust rods includes a second coupling element.

7. The roller mill of claim 1 wherein the coupling element comprises a hydraulic actuator.

8. The roller mill of claim 7 wherein the coupling element is a first coupling element, the roller mill comprising a second coupling element, with the first and second coupling elements being hydraulically connected to one another.

9. The roller mill of claim 1 wherein the synchronization device includes a rotatable shaft and a thrust rod, wherein the coupling element comprises a hollow cylinder in an end region of the thrust rod, wherein a first end of the thrust rod is connected to the rotatable shaft and a second end of the thrust rod is connected to a bearing of the floating bearing unit.

10. The roller mill of claim 1 wherein the synchronization device includes a rotatable shaft and at least two thrust rods, wherein a first end of each thrust rod is connected to the rotatable shaft and a second end of each thrust rod is connected to a respective bearing of the floating bearing unit, wherein the at least two thrust rods are connected to the respective bearing of the floating bearing unit and/or the rotatable shaft via the coupling element in each case, wherein the rotatable shaft includes a first shaft portion and a second shaft portion that are connected to one another via the coupling element.

11. The roller mill of claim 10 wherein the coupling element is configured as a claw coupling.

* * * * *